(12) United States Patent
Roberts et al.

(10) Patent No.: US 8,635,255 B2
(45) Date of Patent: Jan. 21, 2014

(54) METHODS AND SYSTEMS FOR AUTOMATICALLY CUSTOMIZING AN INTERACTION EXPERIENCE OF A USER WITH A MEDIA CONTENT APPLICATION

(75) Inventors: Brian F. Roberts, Dallas, TX (US); Donald H. Relyea, Dallas, TX (US); Shadman Zafar, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 518 days.

(21) Appl. No.: 12/495,318

(22) Filed: Jun. 30, 2009

(65) Prior Publication Data

US 2010/0332570 A1 Dec. 30, 2010

(51) Int. Cl.
*G06F 17/30* (2006.01)
*H04N 21/482* (2011.01)
*G06F 3/048* (2013.01)

(52) U.S. Cl.
USPC .............................. 707/805; 725/44; 715/715

(58) Field of Classification Search
USPC ......... 707/707, 749, 104, 912, 913, 955, 957; 725/37, 44, 46
See application file for complete search history.

(56) References Cited

U.S. PATENT DOCUMENTS

| | | | |
|---|---|---|---|
| 7,363,643 B2 | 4/2008 | Drake et al. | |
| 8,090,715 B2 * | 1/2012 | Matias | 707/726 |
| 8,108,406 B2 * | 1/2012 | Kenedy et al. | 707/749 |
| 8,117,211 B2 * | 2/2012 | Yamamoto et al. | 707/749 |
| 2001/0049620 A1 | 12/2001 | Blasko | |
| 2003/0033420 A1 | 2/2003 | Eyal et al. | |
| 2004/0003396 A1 | 1/2004 | Babu | |
| 2004/0249650 A1 * | 12/2004 | Freedman et al. | 705/1 |
| 2005/0071863 A1 | 3/2005 | Matz et al. | |
| 2006/0129499 A1 * | 6/2006 | Combar et al. | 705/64 |
| 2006/0190358 A1 | 8/2006 | Slik | |
| 2006/0200432 A1 | 9/2006 | Flinn et al. | |
| 2007/0053513 A1 * | 3/2007 | Hoffberg | 380/201 |
| 2007/0233671 A1 * | 10/2007 | Oztekin et al. | 707/5 |
| 2007/0250863 A1 * | 10/2007 | Ferguson | 725/46 |
| 2008/0010534 A1 * | 1/2008 | Athale et al. | 714/38 |
| 2008/0126388 A1 | 5/2008 | Naaman | |
| 2008/0133716 A1 * | 6/2008 | Rao et al. | 709/220 |
| 2009/0077033 A1 * | 3/2009 | McGary et al. | 707/3 |
| 2009/0133078 A1 * | 5/2009 | Hamano et al. | 725/87 |
| 2009/0249400 A1 * | 10/2009 | Carlberg et al. | 725/44 |

* cited by examiner

*Primary Examiner* — Hung T Vy

(57) ABSTRACT

An exemplary method includes generating an interaction feed corresponding to a user of at least one access device, the interaction feed comprising data representative of an interaction of the at least one access device with one or more media content applications, updating metadata within a storage facility with the interaction feed, and automatically customizing an interaction experience of at least one of the user and another user with a media content application in accordance with the metadata. Corresponding methods and systems are also disclosed.

23 Claims, 11 Drawing Sheets

My Interaction Feed 902-1
Added 2 albums to your music wish list
Today at 11:12 am 902-2
Purchased Day & Age by The Killers
Today at 10:56 am 902-3
Gifted 3 songs to Kara
Today at 10:12 am 902-4
Twittered "Battled the traffic to class!"
Today at 10:40 am 902-5
Watched "Three Amigos"
Today at 8:01 am 902-6
Searched for "comedy" in program guide
Today at 7:58 am 902-7
Called mom
Today at 7:18 am 902-8
Accessed espn.com
Today at 7:02 am

Fig. 9

METHODS AND SYSTEMS FOR AUTOMATICALLY CUSTOMIZING AN INTERACTION EXPERIENCE OF A USER WITH A MEDIA CONTENT APPLICATION

BACKGROUND INFORMATION

The proliferation of media content access devices, such as set-top boxes, mobile phones, and the like, have resulted in a plethora of media content choices for users of such devices. However, to access the media content available via media content access devices, a user must interact with an ever growing number of media content applications. For example, a user may interact with one or more subscriber television applications to access media content with a set-top box, one or more mobile phone applications to access media content with a mobile phone, and one or more Web applications to access media content with a personal computer.

A user of multiple media content applications may wish to customize how each application is presented to or otherwise interacts with the user. Unfortunately, such customization typically requires substantial input by the user. For example, a user may be required to specify a user name and password, navigate through one or more setup steps, and/or specify one or more preferences for each application. Such user input is often cumbersome, difficult to perform, and time-consuming.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 9 illustrates an exemplary interaction feed corresponding to a particular user of at least one access device according to principles described herein.

DETAILED DESCRIPTION OF PREFERRED EMBODIMENTS

Exemplary methods and systems for automatically customizing an interaction experience of a user with a media content application are disclosed herein. As described in more detail below, an interaction feed generation facility may be configured to generate an interaction feed corresponding to a user of at least one media content access device. The interaction feed may include data representative of an interaction of the at least one media content access device with one or more media content applications. A metadata layer facility may be configured to update metadata stored within a storage facility with the interaction feed generated by the interaction feed generation facility. A customization facility may be configured to automatically customize an interaction experience of one or more users with a media content application in accordance with the metadata.

As will be described in more detail below, the methods and systems described herein facilitate automatic customization of an interaction experience of a user with a variety of different media content applications, some of which may reside within distinct network platforms. The methods and systems described herein further facilitate automatic customization of an interaction experience of a user with one or more media content applications based on how one or more other users interact with the one or more media content applications. Such automatic customization of interaction experiences may result in a more personalized media content access experience for each user.

As used herein, "media content" may refer generally to any content accessible via a media content access subsystem. The term "media content instance" will be used herein to refer to any television program, on-demand media program, pay-per-view media program, broadcast media program (e.g., broadcast television program), IPTV media content, advertisement (e.g., commercial), video, movie, song, video game, image, photograph, sound, Web page content, or any segment, component, or combination of these or other forms of media content that may be viewed or otherwise experienced by a user. A "media content application" (or simply "application") may include one or more software programs configured to provide one or more media content services to a user and/or facilitate access to one or more media content instances.

Figure 1:
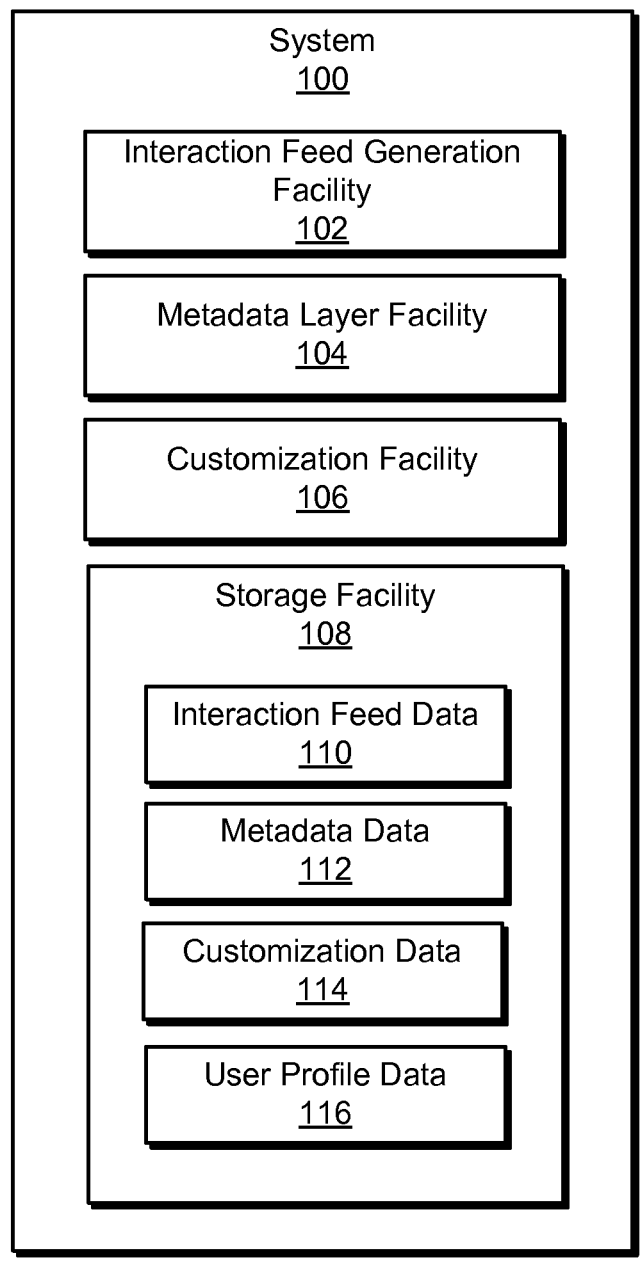
FIG. 1 illustrates an exemplary media content access system according to principles described herein.

FIG. 1 illustrates an exemplary media content access system 100 (or simply "system 100"). As will be described in more detail below, system 100 may be configured to facilitate automatic customization of an interaction experience of one or more users with one or more media content applications accessible via system 100.

System 100 may include, but is not limited to, an interaction feed generation facility 102, a metadata layer facility 104, a customization facility 106, and a storage facility 108. Interaction feed generation facility 102 may be configured to generate an interaction feed corresponding to one or more users of at least one media content access device. As will be described in more detail below, an interaction feed corresponding to a particular user of at least one media content access device may include data representative of an interaction of the at least one media content access device with one or more applications.

In some examples, the interaction between the at least one media content access device and the one or more applications may include one or more "application interaction events" (or simply "interaction events") performed by the at least one media content access device in relation to the one or more applications. Such interaction events may include, but are not limited to, accessing (e.g., viewing and/or listening to), selecting, purchasing, sharing, searching for, tagging, transmitting, and/or otherwise interacting with one or more media content instances accessible via or otherwise associated with the one or more applications. Interaction events may additionally or alternatively include selecting one or more options within the one or more applications, transmitting one or more commands to the one or more applications, logging into one or more applications, accessing one or more Web pages associated with one or more applications, and/or otherwise interacting with or utilizing the one or more applications.

To facilitate generation of one or more interaction feeds associated with one or more users, interaction feed generation facility 102 may be configured to monitor for one or more of the interaction events described herein. When an interaction event is detected, interaction feed generation facility 102 may be configured to generate interaction feed data 110 representative of the interaction event for inclusion within an interaction feed. Exemplary interaction feed data 110 will be described in more detail below. In some examples, interaction feed data 110 may be stored within storage facility 108.

Metadata layer facility 104 may be configured to maintain and update metadata with the interaction feeds generated by interaction feed generation facility 102. In this manner, as will be described in more detail below, the metadata may be representative of how one or more users (and/or their associated media content access devices) interact with one or more applications. In some examples, the metadata may be stored within storage facility 108 as metadata data 112.

Customization facility 106 may be configured to automatically customize an interaction experience of one or more users with an application in accordance with the metadata. In some examples, the application may be included within the one or more applications corresponding to the generated interaction feeds. Additionally or alternatively, the application may include another application not included within the one or more applications. As will be described in more detail below, exemplary customizations of an interaction experience of a user with an application include, but are not limited to, generating and presenting to the user a media content recommendation based on the metadata, generating and presenting to the user a customized advertisement based on the metadata, and/or customizing at least one option associated with the application for the user. Data representative of or otherwise associated with the customized interaction experience may be stored as customization data 114 within storage facility 108.

As shown in FIG. 1, storage facility 108 may additionally or alternatively maintain user profile data 116. As will be described in more detail below, customization facility 106 may be configured to utilize user profile data 116 within an automatic customization of an interaction experience of a user with an application.

System 100, including facilities 102-108, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices, and may employ any of a number of computer operating systems. Moreover, it will be recognized that although facilities 102-108 are shown to be separate facilities in FIG. 1, any of those facilities may be combined into a single facility as may serve a particular application.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
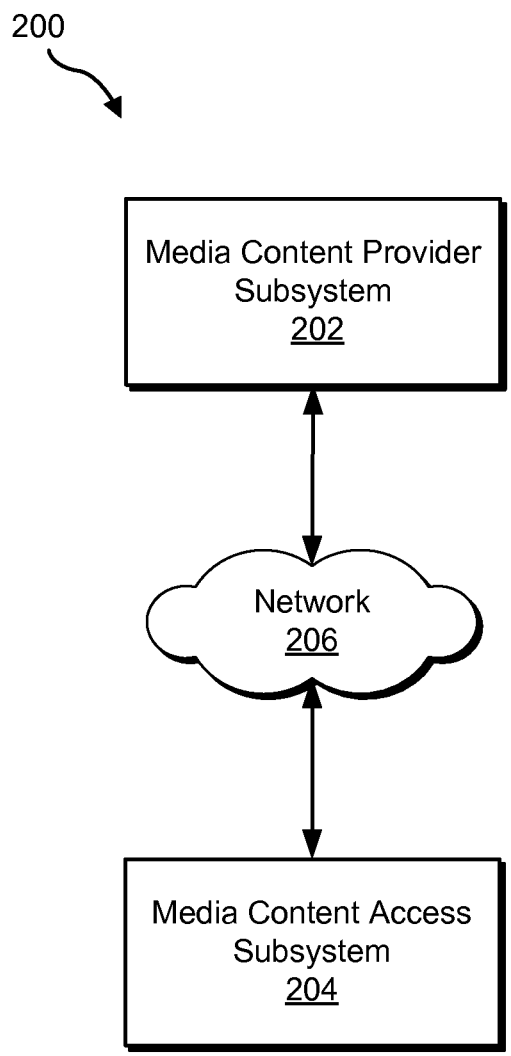
FIG. 2 illustrates an exemplary implementation of the system of FIG. 1 according to principles described herein.

FIG. 2 illustrates an exemplary implementation 200 of system 100 wherein a media content provider subsystem 202 (or simply "provider subsystem 202") is communicatively coupled to a media content access subsystem 204 (or simply "access subsystem 204"). As will be described in more detail below, interaction feed generation facility 102, metadata layer facility 104, customization facility 106, and storage facility 108 may each be implemented on one or both of provider subsystem 202 and access subsystem 204.

Access subsystem 204 may be configured to communicate with and receive a signal and/or data stream containing data representative of media content and/or data associated with media content (e.g., metadata, program guide data, etc.) from provider subsystem 202. Access subsystem 204 and provider subsystem 202 may communicate using any suitable communication technologies, devices, networks, network platforms, media, and protocols supportive of remote data communications.

For example, as shown in FIG. 2, provider subsystem 202 may be configured to communicate with access subsystem 204 over a network 206 (and communications links thereto). Network 206 may include one or more networks or types of networks capable of carrying communications and/or data signals between provider subsystem 202 and access subsystem 204. For example, network 206 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Provider subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection). Moreover, it will be recognized that in some examples, system 100 may be implemented entirely on access subsystem 204.

In some examples, provider subsystem 202 may be configured to generate or otherwise provide media content (e.g., in the form of one or more media content streams) to access subsystem 204. Access subsystem 204 may be configured to facilitate access by a user to media content received from provider subsystem 202. To this end, access subsystem 204 may present the media content for experiencing (e.g., viewing) by a user, record the media content, parse metadata and/or other data associated with the media content, etc. Presentation of the media content may include, but is not limited to, displaying, playing, or otherwise presenting the media content, or one or more components of the media content, such that the media content may be experienced by the user.

Figure 3:
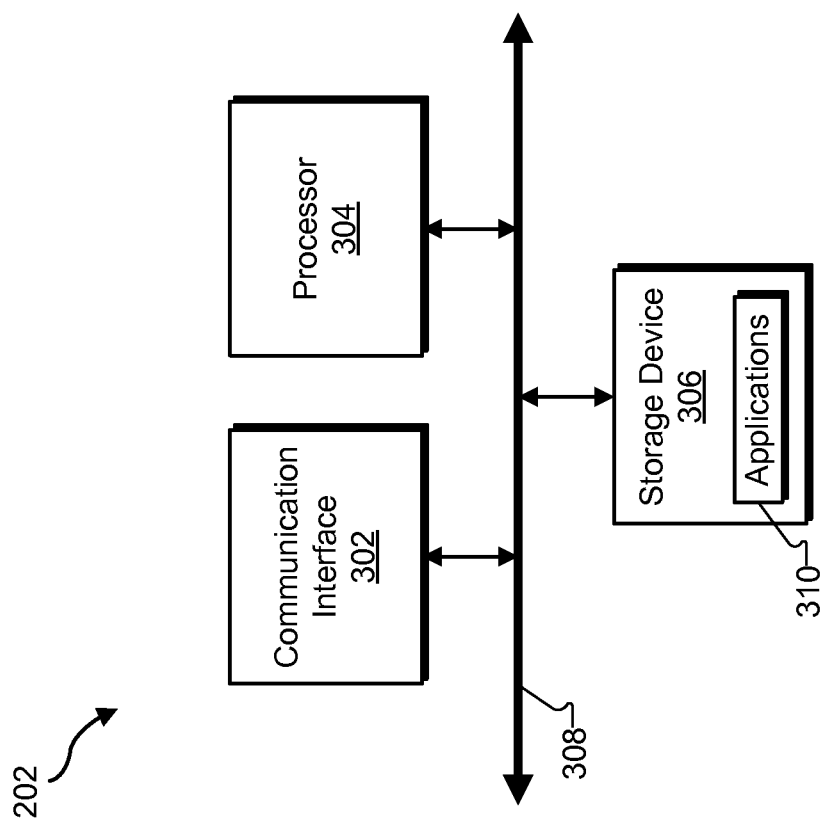
FIG. 3 illustrates exemplary components of a media content provider subsystem according to principles described herein.

FIG. 3 illustrates exemplary components of provider subsystem 202. As shown in FIG. 3, provider subsystem 202 may include a communication interface 302, a processor 304, and a storage device 306 communicatively coupled one to another via a communication infrastructure 308. The components of provider subsystem 202 may communicate with one another, including sending data to and receiving data from one another, using any suitable communication technologies. Moreover, the components of provider subsystem 202 may be implemented on any computing device or combination of computing devices, such as one or more servers, personal computers, or the like.

While an exemplary provider subsystem 202 is shown in FIG. 3, the components illustrated in FIG. 3 are not intended to be limiting. Additional or alternative components may be used in other embodiments. Components of the provider subsystem 202 shown in FIG. 3 will now be described in additional detail.

Communication interface 302 may be configured to communicate with one or more computing devices, including access subsystem 204. In particular, communication interface 302 may be configured to transmit and/or receive communication signals, media content, and/or data to/from access subsystem 204. Examples of communication interface 302 include, without limitation, a wired network interface (such as a network interface card), a wireless network interface (such as a wireless network interface card), a modem, and any other suitable interface. In at least one embodiment, communication interface 302 may provide a direct connection between provider subsystem 202 and access subsystem 204 via a direct link to a network, such as the Internet. Communication interface 302 may additionally or alternatively provide such a connection through, for example, a local area network (such as an Ethernet network), a personal area network, a telephone or cable network, a cellular telephone connection, a satellite data connection, or any other suitable connection.

In some examples, communication interface 302 may be configured to transmit data representative of one or more media content instances to access subsystem 204. Such data may be transmitted in one or more media content data streams, as one or more data files, or in any other suitable manner as may serve a particular application. Communication interface 302 may be configured to interface with any suitable communication media, protocols, and formats, including any of those mentioned above.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 310 or other computer-executable instructions such as may be stored in storage device 306 or another computer-readable medium. As an example, processor 304 may be configured to process data, including modulating, encoding, and/or otherwise preparing data (e.g., media content data) for transmission by communication interface 302.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 310 configured to direct processor 304 to perform any of the operations described herein may be stored within storage device 306. In some examples, data may be arranged in one or more databases residing within storage device 306.

In some examples, interaction feed generation facility 102, metadata layer facility 104, customization facility 106, and/or storage facility 108 may be implemented by or within one or more components of provider subsystem 202. For example, one or more applications 310 residing within storage device 306 may be configured to direct processor 304 to perform one or more processes or functions associated with interaction feed generation facility 102, metadata layer facility 104, and/or customization facility 106. Likewise, storage facility 108 may be implemented by or within storage device 306. For example, interaction feed data 110, metadata data 112, customization data 114, and/or user profile data 116 may be stored within storage device 306.

Figure 4:
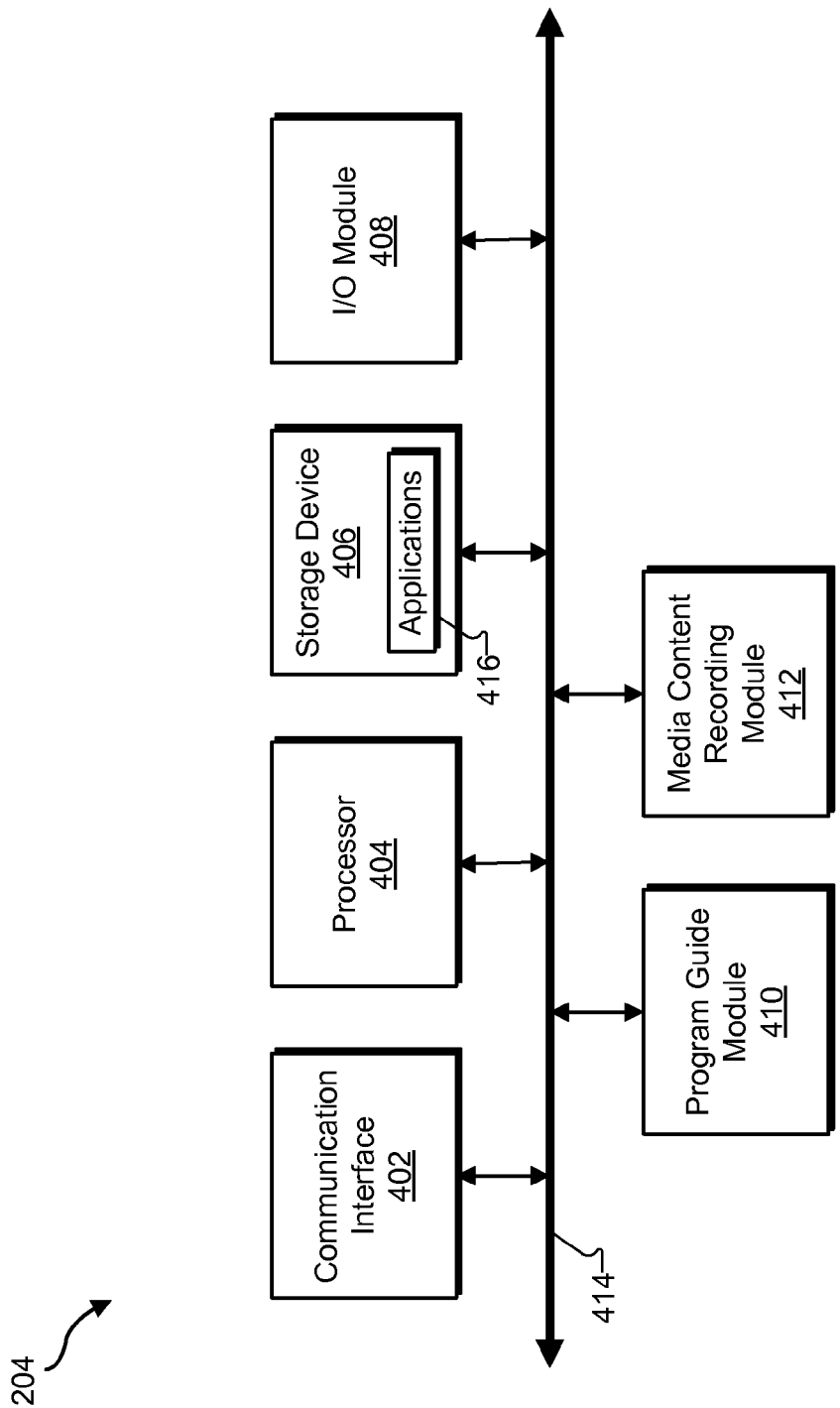
FIG. 4 illustrates exemplary components of a media content access subsystem according to principles described herein.

FIG. 4 illustrates exemplary components of access subsystem 204. As shown in FIG. 4, access subsystem 204 may include a communication interface 402, a processor 404, a storage device 406, an input/output ("I/O") module 408, a program guide module 410, and a media content recording module 412 communicatively coupled one to another via a communication infrastructure 414. The components of access subsystem 204 may communicate with one another, including sending data to and receiving data from one another, using any suitable communication technologies. Moreover, the components of access subsystem 204 may be implemented on any computing device or combination of computing devices, such as a set-top box, a communications device, a mobile device (e.g., a mobile phone device), a hand-held device, a personal computer, a phone device (e.g., Verizon Hub device), a personal-digital assistant device, gaming device, digital video recording ("DVR") device (e.g., a personal video recording ("PVR") device), a television device, and/or any media content access device configured to perform one or more of the processes and/or operations described herein.

While an exemplary access subsystem 204 is shown in FIG. 4, the components illustrated in FIG. 4 are not intended to be limiting. Additional or alternative components may be used in other embodiments. Components of the access subsystem 204 shown in FIG. 4 will now be described in additional detail.

Communication interface 402 may be configured to communicate with one or more computing devices, including provider subsystem 202. In particular, communication interface 402 may be configured to transmit and/or receive communication signals, media content, and/or data to/from provider subsystem 202. Examples of communication interface 402 include, without limitation, a wired network interface (such as a network interface card), a wireless network interface (such as a wireless network interface card), a modem, and any other suitable interface. In at least one embodiment, communication interface 402 may provide a direct connection between provider subsystem 202 and access subsystem 204 via a direct link to a network, such as the Internet. Communication interface 402 may additionally or alternatively provide such a connection through, for example, a local area network (such as an Ethernet network), a personal area network, a telephone or cable network, a cellular telephone connection, a satellite data connection, or any other suitable connection.

As mentioned, provider subsystem 202 may transmit data representative of one or more media content instances. Communication interface 402 may be configured to receive such data such that the data may be processed by access subsystem 204. To this end, communication interface 402 may include any device, logic, and/or other technologies suitable for receiving signals, data streams, and/or data representative of media content. Communication interface 402 may be configured to interface with any suitable communication media, protocols, and formats, including any of those mentioned above.

In certain embodiments, provider subsystem 202 may be configured to transmit and access subsystem 204 may be configured to receive data streams or signals including data representative of various media content instances in accordance with a transmission schedule. The transmission schedule may specify that particular media content instances are to be transmitted at scheduled transmission times and on certain media content carrier channels. As used herein, the term "scheduled transmission time" or "scheduled transmission" may refer generally to any period of time during which a media content instance is to be transmitted to access subsystem 204. The term "media content carrier channel" or "media content channel" as used herein may refer generally to any carrier of media content, including, but not limited to, media (e.g., television) channels, streams, addresses, frequencies or other carriers of media content.

Communication interface 402 may be configured to selectively identify, receive, and/or process appropriate data streams and/or media content instances at the scheduled transmission times and on the appropriate media content carrier channels. For instance, in certain implementations communication interface 402 may include a tuner configured to selectively receive media content carried on a particular media content carrier channel. The tuner may be tuned to a particular media content carrier channel such that the media content carried on the media content carrier channel is received and may be processed by access subsystem 204.

In some examples, communication interface 402 may include multiple tuners such that media content carried on different media content carrier channels may be concurrently received for processing by the access subsystem 204. For example, communication interface 402 may include a first tuner configured to receive media content carried on an analog video signal and a second tuner configured to concurrently receive media content carried on a digital compressed signal.

While one or more tuners may be used to receive various types of media content-carrying signals transmitted by provider subsystem 202, additionally or alternatively, communication interface 402 may be configured to receive other types of signals (e.g., other types of media content carrying signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of signals, communication interface 402 may receive and forward the signals directly to other components of access subsystem 204 without the signals going through a tuner. For an IP-based signal, for example, communication interface 402 may function as an IP receiver.

Processor 404 generally represents any type or form of processing unit capable of processing data or interpreting, executing, and/or directing execution of one or more of the instructions, processes, and/or operations described herein. Processor 404 may direct execution of operations in accordance with one or more applications 504 or other computer-executable instructions such as may be stored in storage device 406 or another computer-readable medium. As an example, processor 404 may be configured to process data, including demodulating, decoding, and/or parsing data (e.g., data representative of media content received from provider subsystem 202 by communication interface 402), and encoding and modulating data for transmission by communication interface 402.

Storage device 406 may include one or more data storage media, devices, or configurations and may employ any type, form, and combination of data storage media and/or device. For example, storage device 406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 406. For example, data representative of one or more executable applications 416 configured to direct processor 404 to perform any of the operations described herein may be stored within storage device 406. In some examples, data may be arranged in one or more databases residing within storage device 406.

I/O module 408 may be configured to receive user input and provide user output and may include any hardware, firmware, software, or combination thereof supportive of input and output capabilities. For example, I/O module 408 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O module 408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 408 is configured to provide graphical data to a display for presentation to a user. The graphical data may representative of one or more graphical user interfaces ("GUIs"), GUI views, media content views, and/or any other view as may serve a particular application.

Program guide module 410 may be configured to maintain and operate on program guide data. As mentioned above, media content instances may be transmitted by provider subsystem 202 at scheduled transmission times and on certain media content carrier channels. To assist access subsystem 204 and/or a user of access subsystem 204 with reception of media content instances at appropriate scheduled transmission times and on appropriate media content carrier channels, program guide data may be received by communication interface 402 from provider subsystem 202 and/or from another source. The program guide data may be stored in storage device 406.

Program guide module 410 may be configured to arrange and provide graphical data representative of a program guide view to I/O module 408 for inclusion in a GUI. I/O module 408 may generate and provide a GUI including the program guide view to a display for presentation to a user. A program guide view may include a graphical arrangement of program guide data, one or more program guide tools (e.g., program guide navigation, search, and/or filter tools), one or more graphical selectors for navigating and highlighting selectable options, and/or other graphics. Typically, a program guide view presents at least a portion of a media content transmission schedule to a user. The user may utilize the program guide view to access information about media content instances and scheduled transmission times and channels associated with the media content instances.

Media content recording module 412 may be configured to record data representative of media content to storage device 406. The recording of a media content instance is typically performed during a transmission time slot when data representative of the media content instance is received from provider subsystem 202 as described above. For example, during transmission of a media content instance from provider subsystem 202 to access subsystem 204 on a media content carrier channel, communication interface 402 may receive data representative of the media content instance on the media content carrier channel, and media content recording module 412 may direct that the received data representative of the media content instance be stored to storage device 406. Once stored, the data representative the media content instance may be accessed and processed as may suit a particular application, including providing data representative of the media content instance to a display for presentation to a user.

In some examples, interaction feed generation facility 102, metadata layer facility 104, customization facility 106, and/or storage facility 108 may be implemented by or within one or more components of access subsystem 204. For example, one or more applications 416 residing within storage device 406 may be configured to direct processor 404 to perform one or more processes or functions associated with interaction feed generation facility 102, metadata layer facility 104, and/or customization facility 106. Likewise, storage facility 108 may be implemented by or within storage device 406. For example, interaction feed data 110, metadata data 112, customization data 114, and/or user profile data 116 may be stored within storage device 406.

Figure 5:
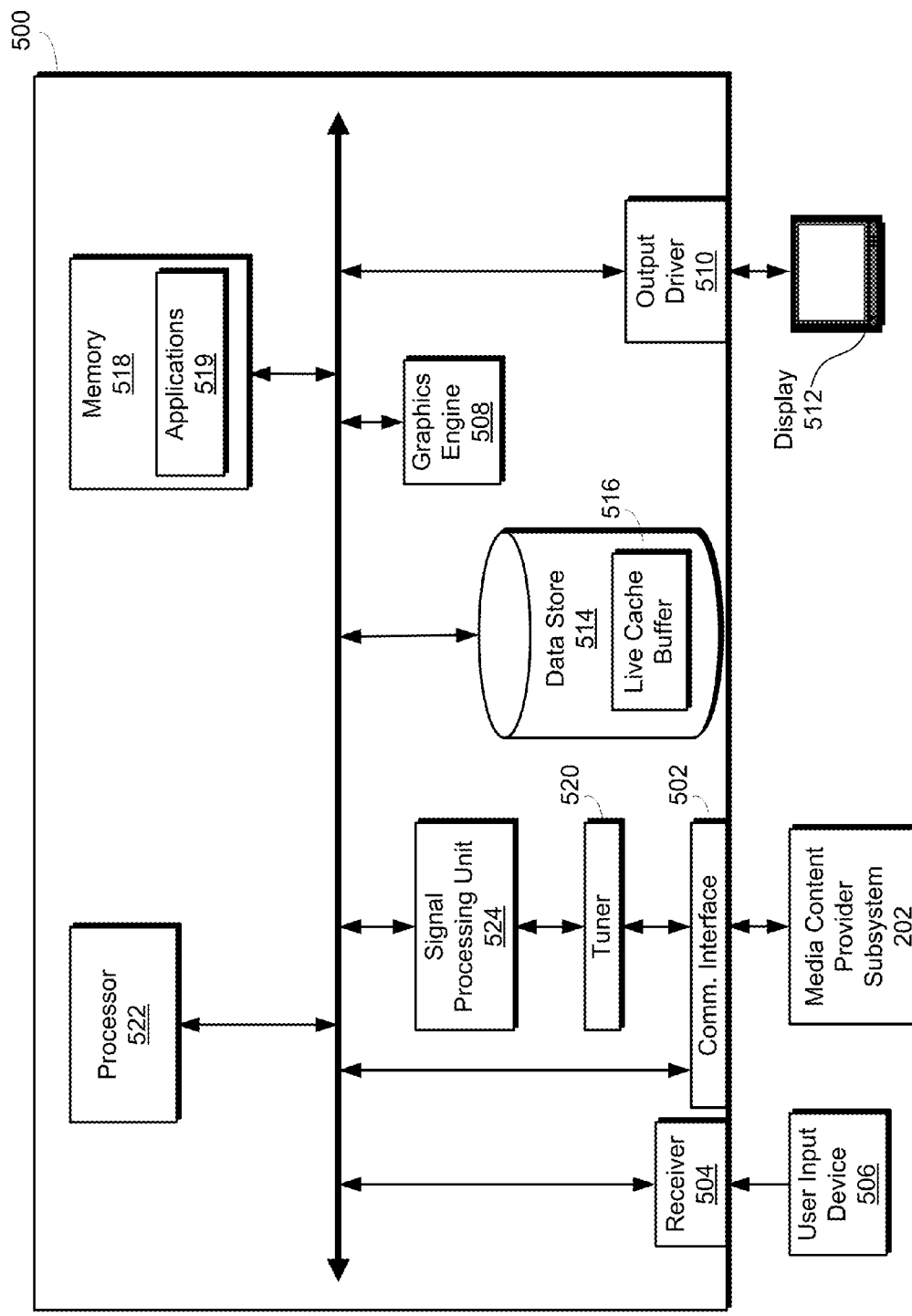
FIG. 5 illustrates an exemplary media content access device having the media content access subsystem of FIG. 4 implemented thereon according to principles described herein.

Access subsystem 204 and/or components of access subsystem 204 may be implemented as may suit a particular application. FIG. 5 illustrates an exemplary media content access device 500 (or simply "access device 500") having access subsystem 204 implemented thereon. Access device 500 may include one or more of the components of access subsystem 204 shown in FIG. 4 and may be configured to perform one or more of the processes and/or operations described herein. Access device 500 may include, but is not limited to, a set-top box, a media content processing device, a communications device, a mobile device (e.g., a mobile phone device), a handheld device, a personal computer, a phone device (e.g., Verizon Hub device), a personal-digital assistant device, a gaming device, a DVR device (e.g., a personal video recording PVR device), a television device, and/or any device configured to perform one or more of the processes and/or operations described herein.

As shown in FIG. 5, access device 500 may include a communication interface 502 configured to receive media content (e.g., media content) and/or data (e.g., metadata, program guide data, and/or any other data associated with media content) in any acceptable format from provider subsystem 202 or from any other suitable external source. Communication interface 502 may include any device, logic, and/or other technologies suitable for receiving signals and/or data representative of media content and/or other types of media content or data. Communication interface 502 may be configured to interface with any suitable communication media, protocols, and formats, including any of those mentioned above.

Access device 500 may also include a receiver 504 configured to receive user input signals from a user input device 506. User input device 506 may include, for example, a remote control device or any other suitable input device and may be configured to communicate with receiver 504 via a wireless link, electrical connection, or any other suitable communication link.

In some examples, access device 500 may include a graphics engine 508 and an output driver 510. Graphics engine 508 may be configured to generate graphics to be provided to output driver 510, which may be configured to interface with or drive a display 512. Output driver 510 may provide output signals to display 512, the output signals including graphical media content (e.g., media content and/or program guide media content) generated by graphics engine 508 and to be presented by display 512 for experiencing by a user. For example, output driver 510 may provide a data representative of a GUI including a program guide view to display 512 for presentation to the user. Graphics engine 508 and output driver 510 may include any combination of hardware, software, and/or firmware as may serve a particular application.

Data store 514 may include one or more data storage media, devices, or configurations and may employ any type, form, and combination of storage media. For example, data store 514 may include, but is not limited to, a hard drive, network drive, flash drive, magnetic disc, optical disc, or other non-volatile storage unit. Media content and/or data associated with media content may be temporarily and/or permanently stored in data store 514.

Data store 514 is shown to be included within access device 500 in FIG. 5 for illustrative purposes only. It will be understood that data store 514 may additionally or alternatively be located external to access device 500.

Data store 514 may include one or more live cache buffers 516. Live cache buffer 516 may additionally or alternatively reside in memory 518 or in a storage device external to access device 500. In some examples, media content data may be temporarily stored in live cache buffer 516 to facilitate viewing and/or recording of the media content.

Access device 500 may include memory 518. Memory 518 may include, but is not limited to, FLASH memory, random access memory ("RAM"), dynamic RAM ("DRAM"), other suitable computer-readable media, or any combination or sub-combination thereof. In some examples, one or more applications 519 configured to run on or otherwise be executed by access device 500 may reside in memory 518.

Access device 500 may include one or more tuners 520. Tuner 520 may be configured to selectively receive media content carried on a particular media content carrier channel such that the media content may be processed by access device 500. In some examples, media content received by tuner 520 may be temporarily buffered, or stored, in the live cache buffer 516. If there are multiple tuners 520, there may be a live cache buffer 516 corresponding to each of the tuners 520.

While tuner 520 may be used to receive certain media content-carrying signals transmitted by provider subsystem 202, access device 500 may be configured to receive other types of media content signals (including media content signals and/or program guide data signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of media content signals, communication interface 502 may receive and forward the signals directly to other components of access device 500 (e.g., processor 522 or signal processing unit 524, described in more detail below) without the signals going through tuner 520. For an IP-based signal, for example, signal processing unit 524 may function as an IP receiver.

Access device 500 may include at least one processor, such as processor 522, configured to control and/or perform one or more operations of access device 500. Access device 500 may also include a signal processing unit 524 configured to process incoming media content. Signal processing unit 524 may be configured, for example, to demodulate and parse encoded digital media content. In some examples, access device 500 may include one or more signal processing units 524 corresponding to each of the tuners 520.

In some examples, provider subsystem 202 may be configured to support communication with access subsystem 204 via multiple network platforms. For example, a user 230 may utilize multiple access devices 500, each a part of a different network platform, to access one or more applications and/or media content residing within provider subsystem 202.

Figure 6:
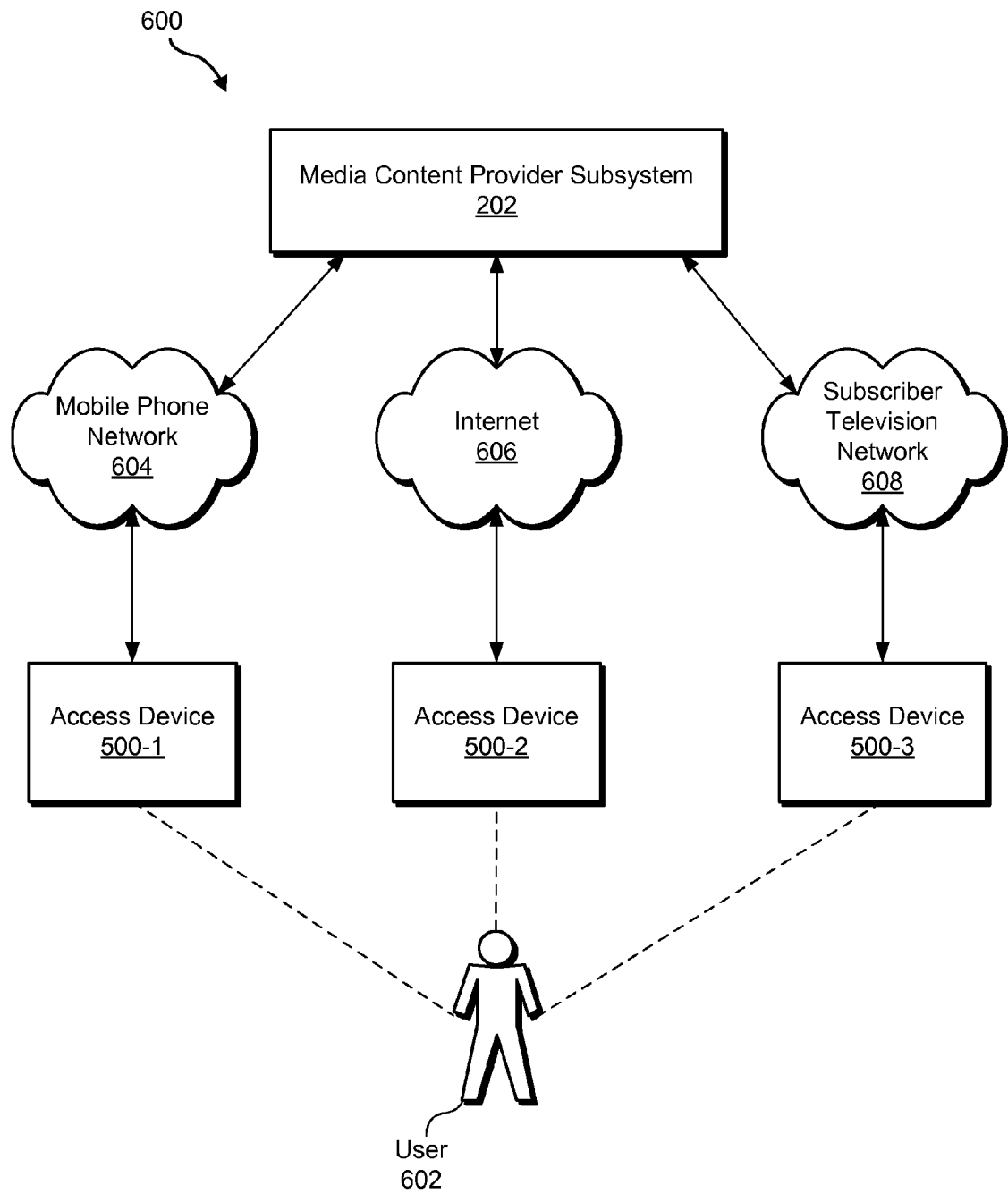
FIG. 6 shows another exemplary implementation of the system of FIG. 1 according to principles described herein.

To illustrate, FIG. 6 shows an exemplary implementation 600 of system 100. As shown in FIG. 6, implementation 600 may include provider subsystem 202 and access devices 500-1 through 500-3 (collectively referred to herein as "access devices 500") utilized by or otherwise associated with a user 602. Provider subsystem 202 may be configured to communicate with each access device 500 over a distinct network platform. For example, provider subsystem 202 may be configured to communicate with access device 500-1 (e.g., a mobile phone) over a mobile phone network 604, with access device 500-2 (e.g., a personal computer) over the Internet 606, and/or with access device 500-3 (e.g., a set-top box) over a subscriber television network 608. Hence, user 230 may be able to utilize any of the access devices 500-1 through 500-3 to access one or more applications and/or media content residing within provider subsystem 202. It will be recognized that mobile phone network 604, the Internet 606, and subscriber television network 608 may be part of network 206 shown in FIG. 2. It will also be recognized that the networks shown in FIG. 6 are merely illustrative of the many different types of networks that may facilitate communication between provider subsystem 202 and access subsystem 204.

Figure 7:
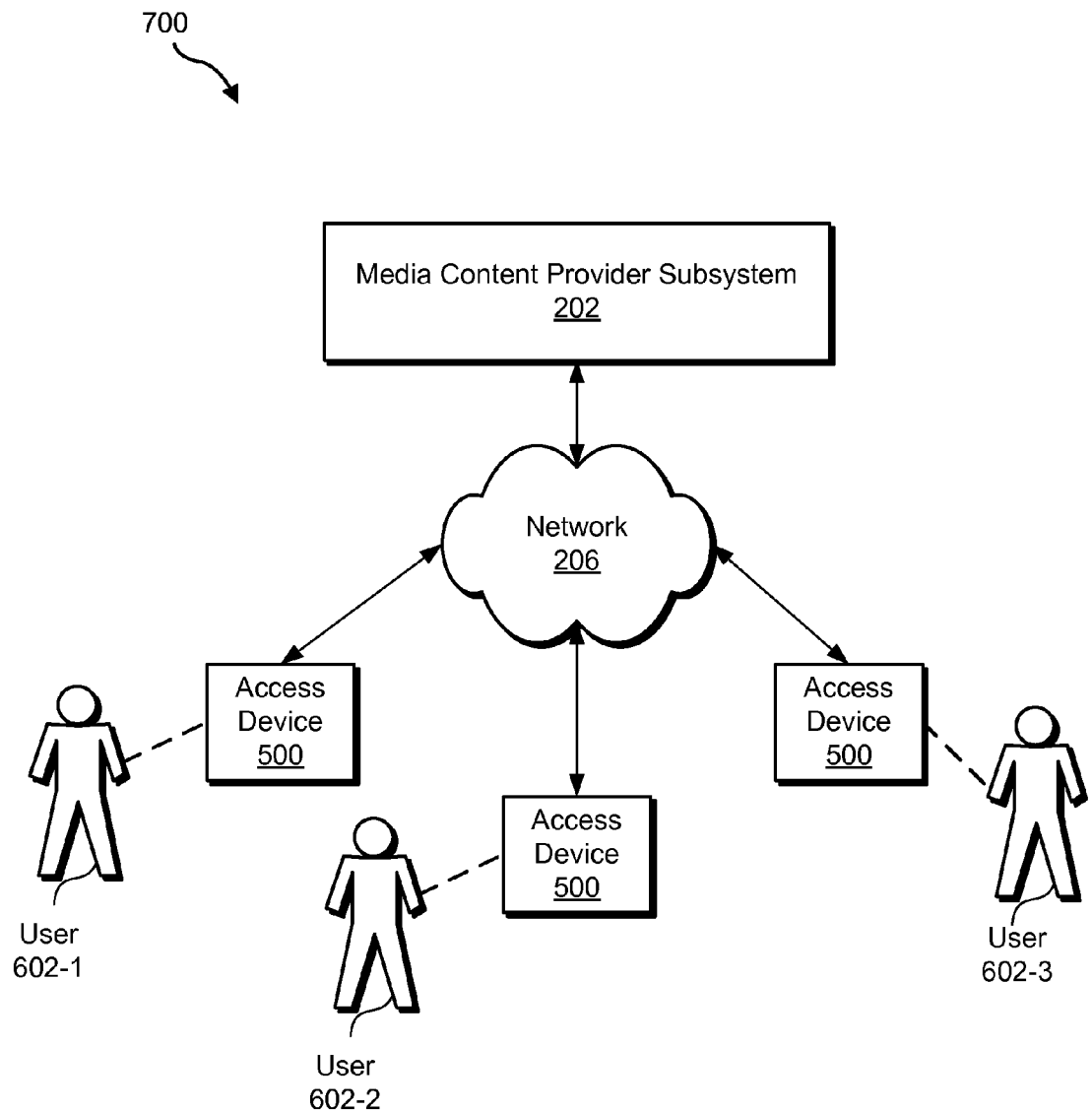
FIG. 7 shows another exemplary implementation of the system of FIG. 1 according to principles described herein.

System 100 may additionally or alternatively be configured to support interaction with multiple users. For example, FIG. 7 shows an exemplary implementation 700 of system 100 wherein multiple users 602-1 through 602-3 (collectively referred to herein as "users 602") may utilize one or more access devices 500 to communicate with provider subsystem 202 over network 206.

In some examples, a user of an access device 500 may utilize one or more applications residing within provider subsystem 202 and/or the access device 500 in order to access media content available via provider subsystem 202. The one or more applications may be included within applications 310, applications 416, and/or applications 519, for example, and may be executed by any computing device implementing or included within provider subsystem 202 and/or access subsystem 204. Each application may include one or more software programs configured to provide one or more media content services to the user and/or facilitate access to one or more media content instances. For example, exemplary applications that may be utilized by a user to access media content include, but are not limited to, media content presentation applications, subscriber television applications, program guide applications, content management applications, Web applications, Web browsers, telephone applications, e-mail applications, video-on-demand applications, music-on-demand applications, online video and music store applications, advertisement applications, media content search applications, media content recommendation applications, media content storage applications, media content sharing applications, social networking applications, location-based applications, contact management applications, and/or any other application that facilitates access to media content available via provider subsystem 202 and/or access subsystem 204.

As mentioned, it is often desirable to customize how an application is presented to or otherwise interacts with a user. To this end, the methods and systems described herein facilitate automatic customization of an interaction experience of one or more users with one or more applications. As will be described herein, such customization may be facilitated by generating an interaction feed for each application with which the user interacts. Each interaction feed may be used to update metadata accessible by each of the applications. The metadata may be used by the applications and/or new applications with which the user desires to interact in order to customize an interaction experience of the user with those applications.

Figure 8:
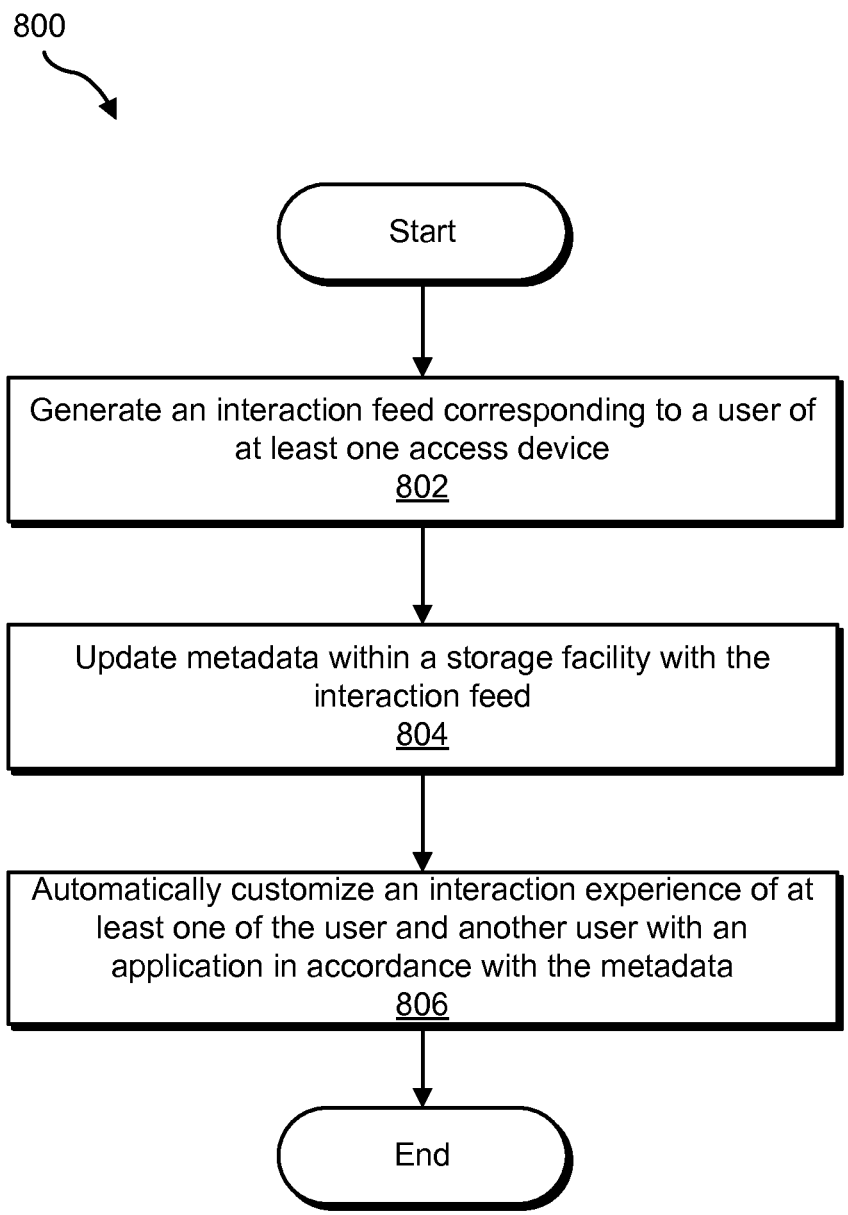
FIG. 8 illustrates an exemplary method of automatically customizing an interaction experience of one or more users with one or more applications according to principles described herein.

FIG. 8 illustrates an exemplary method 800 of automatically customizing an interaction experience of one or more users with one or more applications. While FIG. 8 illustrates exemplary steps according to one embodiment, other embodiments may omit, add to, reorder, and/or modify any of the steps shown in FIG. 8.

In step 802, an interaction feed corresponding to a user of at least one access device is generated. For example, interaction feed generation facility 102 may be configured to generate an interaction feed comprising data representative of an interaction of the at least one access device with one or more applications. To this end, interaction feed generation facility 102 may be configured to monitor for one or more of the interaction events described herein. When an interaction events is detected, interaction feed generation facility 102 may be configured to generate interaction feed data representative of the interaction event for inclusion within the interaction feed.

FIG. 9 illustrates an exemplary interaction feed 900 corresponding to a particular user of at least one access device. As shown in FIG. 9, interaction feed 900 includes a log of a plurality of interaction events 902 (e.g., interaction events 902-1 through 902-8) performed by the user with respect to one or more applications. For illustrative purposes only, interaction events may be referred herein as being performed "by a user." It will be recognized, however, that interaction events may be actually performed by an access device utilized or otherwise associated with a user.

Each interaction event 902 included within interaction feed 900 may be associated with one or more applications utilized by the user to access media content. For example, interaction events 902-1 through 902-3 may correspond to interactions of a user with an online music store application. As shown in FIG. 9, interaction event 902-1 represents an interaction of the user with the online music store wherein the user added two albums to a music wish list. Interaction 902-2 represents an interaction of the user with the online music store application wherein the user purchased a particular song using the online music store application. Interaction event 902-3 represents an interaction of the user with the online music store application wherein the user gifted three songs to a friend.

Other interaction events 902 shown within interaction feed 900 represent other types of interactions of the user with other applications. For example interaction event 902-4 represents an interaction of the user with an online social networking application wherein the user created a Twitter posting, interaction event 902-5 represents an interaction of the user with a subscriber television application wherein the user watched a particular movie, interaction event 902-6 represents an interaction of the user with a media content search application wherein the user searched for a particular term within a program guide, interaction event 902-7 represents an interaction of the user with a telephone application wherein the user placed a telephone call to a particular person, and interaction event 902-8 represents an interaction of the user with a Web browser application wherein the user accessed a particular website. It will be recognized that interaction events 902 shown within FIG. 9 are merely representative of the many different interaction events that may be included within interaction feed 900.

An interaction feed (e.g., interaction feed 900) may include one or more fields associated with each interaction event. Each field may include data generated by interaction feed generation facility 102 that is descriptive of the interaction event. For example, an interaction feed may include a subject field containing data descriptive of the type of interaction event, a keyword field containing data descriptive of one or more keywords associated with the interaction event, a timestamp field containing data representative of a timestamp associated with the interaction event, an application identification field containing data identifying the application associated with the interaction event, a user identification field containing data identifying the user associated with the interaction event, an access device identification field containing data identifying the access device used to perform the interaction event, and/or any other field associated with the interaction event as may serve a particular application.

The interaction feed may be generated in any programming language as may serve a particular application. For example, the interaction feed may be generated using a custom markup language (e.g., extensible markup language ("XML")). In this manner, the data included within the interaction feed may be recognized and processed by a variety of different applications and/or computing devices.

FIG. 9 shows that a single interaction feed may be generated to represent an interaction of a single user with a plurality of applications. In some alternative examples, a plurality of interaction feeds may be generated that correspond to a single user. For example, an interaction feed may be generated for each application with which the user interacts. To illustrate, if the user interacts with four distinct applications, four distinct interaction feeds may be generated to represent the interaction events performed by the user in relation to each of the applications.

In some examples, the one or more applications upon which the interaction feed generated in step 802 is based reside within distinct network platforms. For example, a user may access a mobile phone application via mobile phone network 604, a Web application via Internet 606, and a subscriber television application via subscriber television network 608. Hence, interaction feed generation facility 102 may be configured to monitor for and detect interaction events performed by a user that are facilitated by each of these networks 604, 606, and 608. When an interaction event performed within any of these network platforms is detected, an interaction feed associated with the user may be updated accordingly. In this manner, as will be described in more detail below, an interaction experience of a user with a particular application residing within a particular network platform may be customized based on an interaction of the user with one or more other applications that reside within one or more other network platforms.

In step 804, metadata within a storage facility is updated with the interaction feed generated in step 802. For example, metadata layer facility 104 may be configured to update the metadata stored within storage facility 108 with the interaction feed generated in step 802.

To facilitate the updating of the metadata, interaction feed generation facility 102 may be configured to transmit the interaction feed to metadata layer facility 104. Upon receiving the interaction feed, metadata layer facility 104 may update the metadata stored within storage facility 108 with the interaction feed. The updating may be performed by metadata layer facility 104 in any suitable manner. For example, metadata layer facility 104 may be configured to insert the data included within the interaction feed into one or more predefined fields included within the metadata. In some examples, the predefined fields may be configured to correspond to the fields included within the interaction feed.

In some examples, the metadata included within storage facility 108 may additionally be updated with one or more additional interaction feeds corresponding to one or more additional users. Hence, the metadata may comprise data representative of how a plurality of users interact with one or more applications. In this manner, as will be described in more detail below, an interaction experience of a particular user with a particular application may be customized based on an interaction of one or more other users with the particular application and/or with any other application.

In step 806, an interaction experience of at least one of the user and another user with an application is automatically customized in accordance with the metadata. The customization of the interaction experience may be performed by customization facility 106 in accordance with the metadata in any suitable manner. Exemplary interaction experiences that may be customized by customization facility 106 will be described in more detail below.

In some examples, the application with which an interaction experience of a user is customized may be included within the one or more applications upon which the interaction feed generated in step 802 is based. For example, an interaction feed may be generated based on an interaction of a user with a subscriber television application. Metadata within storage facility 108 may be subsequently updated with the interaction feed. A subsequent interaction experience of the user with the subscriber television application may then be customized based on the metadata comprising data representative of the initial interaction of the user with the subscriber television application.

Alternatively, the application with which an interaction experience of a user is customized may be another application not included within the one or more applications upon which the interaction feed generated in step 802 is based. For example, an interaction feed may be generated based on an interaction of a user with a subscriber television application. Metadata within storage facility 108 may be subsequently updated with the interaction feed. The user may then interact with a new application (e.g., an online music store application). An interaction experience of the user with the new application may be automatically customized based on the metadata comprising data representative of the interaction of the user with the subscriber television application.

In some examples, customization facility 106 is configured to customize an interaction experience of the same user with which the interaction feed generated in step 802 is associated. For example, as illustrated above, an interaction feed may be generated based on an interaction of a particular user with a subscriber television application. A subsequent interaction experience of the same user with the subscriber television application and/or with any other application may then be customized in accordance with metadata comprising data representative of the interaction feed associated with the user.

Additionally or alternatively, customization facility 106 may be configured to customize an interaction experience of another user not associated with interaction feed generated in step 802. For example, an interaction feed may be generated based on an interaction of a first user with a particular application. Metadata within storage facility 108 may be subsequently updated with the interaction feed. An interaction experience of a second user with the particular application and/or with another application may be automatically customized based on the metadata comprising data representative of the interaction of the first user with the particular application.

A number of examples of customizing an interaction experience of one or more users with one or more applications will now be described. It will be recognized that the examples described herein are merely illustrative of the many ways in which customization facility 106 may customize an interaction experience of one or more users with one or more applications.

In some examples, customization facility 106 may be configured to automatically customize an interaction experience of a user with an application by generating and presenting a media content recommendation within the application to the user. To illustrate, an interaction feed associated with a user may indicate that the user purchased and watched a particular video on demand (e.g., "Three Amigos") via a set-top box during the evening of a particular day. The next day, the user may access an online music store application. Customization facility 106 may customize an interaction experience of the user with the online music store application by automatically generating and presenting one or more song recommendations to the user that are associated "Three Amigos." For example, customization facility 106 may direct the online music store application to recommend a song included within "Three Amigos" (e.g., the song entitled "My Little Buttercup") to the user for purchase. As described above, the customization may be performed by customization facility 106 based on the metadata that has been updated with the interaction feed associated with the user.

One or more media content recommendations may additionally or alternatively be generated and presented to a second user of one or more applications based on how a first user interacts with a particular application. The first and second users may be friends, family members, work associates, and/or related one to another in any other way.

To illustrate, in the example above with the user who purchased and watched "Three Amigos," customization facility 106 may additionally or alternatively customize an interaction experience of a second user based on the detected interaction of the user with the video on demand application. For example, customization facility 106 may direct a subscriber television application associated with the second user to generate and present one or more media content recommendations to the second user that are related to "Three Amigos." Such media content recommendations may include a recommendation to purchase and view "Three Amigos," a movie involving one or more of the cast of "Three Amigos," and/or any other media content instance related in some way to "Three Amigos." In some examples, a media content recommendation presented to the second user may include a notification message that the media content recommendation is being presented to the second user because the first user purchased and watched "Three Amigos."

One or more media content recommendations may additionally or alternatively be generated and presented to a user of one or more applications based on how a plurality of other users interact with one or more applications. For example, customization facility 106 may be configured to generate a media content recommendation for a particular user by processing metadata that has been updated with a plurality of interaction feeds associated with a plurality of users to determine which media content instances should be recommended to the user. The processing of metadata and determination of media content recommendations may be performed in accordance with any suitable heuristic as may serve a particular application.

Automatic generation and presentation of media content recommendations to a user based on how another user interacts with an application may facilitate sharing of media content between the users and may ensure that a user is being presented with media content likely to be most consistent with the user's preferences. Such media content recommendations may also be useful for users who desire to be like other users in their selection of media content. For example, automatically generated media content recommendations based on how a leader of a social clique interacts with one or more applications may be used by other members of the social clique to access the same or similar media content accessed by the leader.

Additionally or alternatively, customization facility 106 may be configured to automatically customize an interaction experience of a user with an application by generating and presenting customized advertising to a user based on how the user and/or one or more other users interact with one or more applications. To illustrate, in the example above with the user who purchased and watched "Three Amigos," customization facility 106 may be configured to direct an advertisement application to generate and present customized advertisements (e.g., advertisements for chips and salsa, trips to Mexico, etc.) to the user during the presentation of "Three Amigos" or during any other time period as may serve a particular application.

Additionally or alternatively, customization facility 106 may be configured to automatically customize an interaction experience of a user with an application by customizing at least one option associated with the application in accordance how the user interacts with one or more other applications. For example, interaction feed generation facility 102 may be configured to detect that a user has interacted with a particular application by customizing one or more options associated with the application. To illustrate, interaction feed generation facility 102 may detect that the user has customized a background view associated with a particular application, a user name associated with the application, a password associated with the application, a font size associated with the application, a resolution associated with the application, a default volume level associated with the application, one or more access preferences associated with the application, and/or any other option associated with the application. The user may subsequently access a new application and desire to customize the same set of options in the new application that were customized in the first application. To this end, customization facility 106 may be configured to automatically customize one or more options within the new application based on metadata representative of the customization of options performed by the user in relation to the first application. For example, customization facility 106 may be configured to automatically assign the same user name, password, and/or any other customized option associated with the first application to the new application.

In some examples, customization facility 106 may be configured to at least partially base the automatic customization of the interaction experience of a user with an application on a user profile associated with the user and/or another user. As used herein, a user profile is configured to represent one or more personal traits associated with the user. For example, a user profile may include data representative of a user's age, gender, income level, profession, family status, nationality, preferred genre of media content, etc. Such information, in addition to an interaction feed associated with one or more users, may be used to customize an interaction experience of the user with one or more applications. For example, a media content recommendation presented to a particular user may be based at least in part on one or more traits associated with the user as defined within a user profile corresponding to the user.

Figure 10:
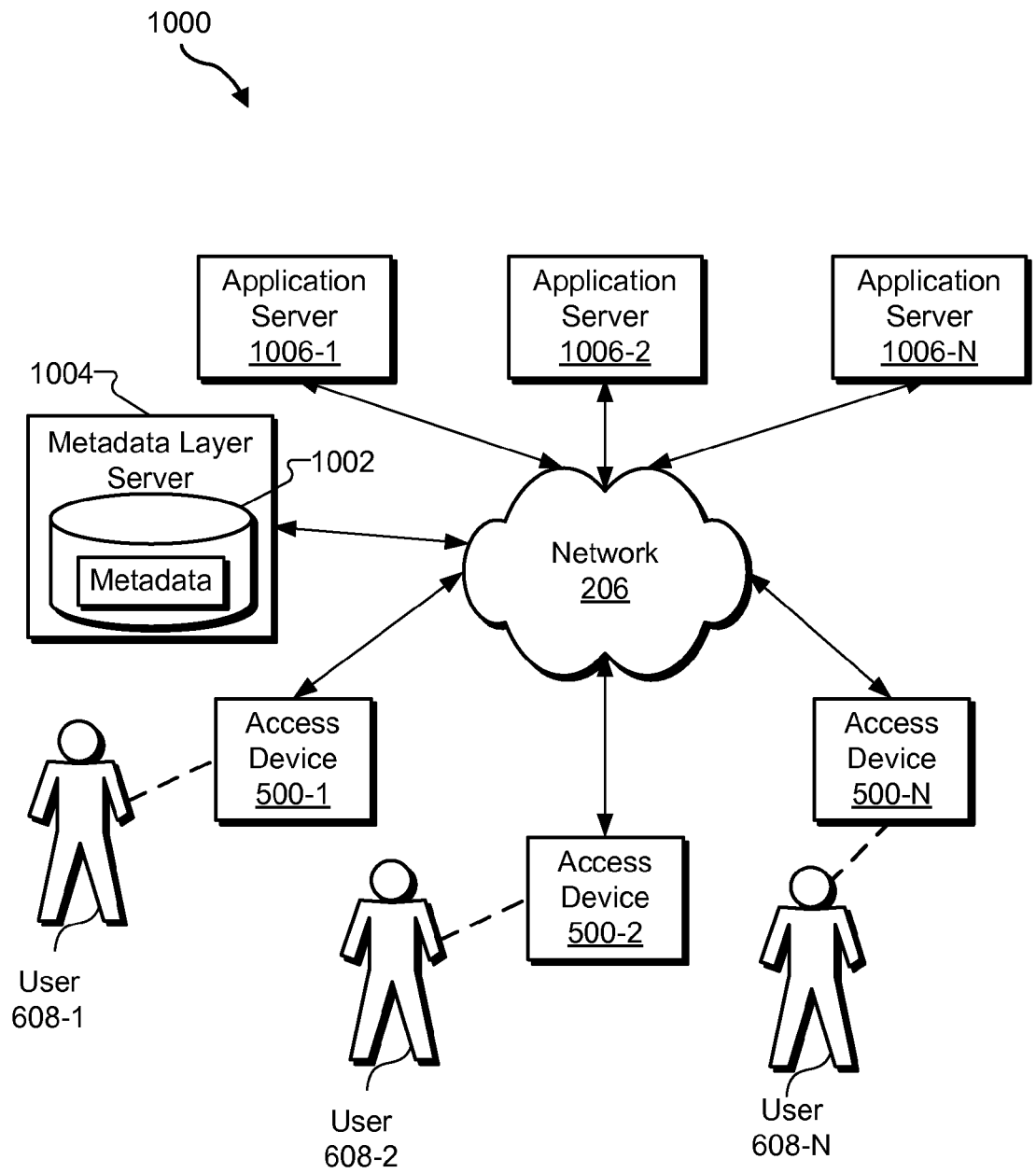
FIG. 10 illustrates a specific implementation of the system of FIG. 1 according to principles described herein.

FIG. 10 illustrates a specific implementation 1000 of system 100 wherein the metadata upon which a customization of an interaction experience for one or more users is based resides within a storage device 1002 that is part of a metadata layer server 1004. As shown in FIG. 10, metadata layer server 1004 may be configured to communicate with a plurality of application servers 1006-1 through 1006-N (collectively referred to herein as "application servers 1006") and a plurality of access devices 500-1 through 500-N (collectively referred to herein as "access devices 500") via network 206. Each access device 500 may be used by a user 608 (e.g., user 608-1, user 608-2, and user 608-N) to access one or more applications residing within application servers 1006. Interaction feed generation facility 102 and/or customization facility 106 may be implemented on or included within one or more of application servers 1006 and/or access devices 500.

In some examples, each of the application servers 1006 is associated with a distinct network platform. Hence, to access an application residing on a particular application server (e.g., application server 1006-1), an access device (e.g., access device 500-1) may be configured to operate within the network platform of which the application server 1006-1 is a part.

Metadata layer server 1004 may include any computing device configured to perform one or more of the metadata-related functions described herein. For example, metadata layer facility 104 and storage facility 108 may be implemented on or included within metadata layer server 1004.

In some examples, each of the application servers 1006 and access devices 500 may be configured to communicate with metadata layer server 1004 in order to access the metadata residing thereon. In this manner, a customization facility 106 residing on one or more of application servers 1006 and/or access devices 500 may customize an interaction experience of one or more of the users 608 with one or more applications residing on application servers 1006.

In some examples, an access device 500 may be configured to generate and display a GUI configured to represent an interaction feed associated with a user. For example, interaction feed 900 illustrated in FIG. 9 may be displayed within a GUI by access device 500 so that a user thereof may view one or more of the interaction events 902 included within the interaction feed 900. It will be recognized that an interaction feed may be displayed within a GUI by access device 500 in any suitable manner. Moreover, it will be recognized that any number of interaction feeds associated with any number of users may be displayed by access device 500.

Figure 11:
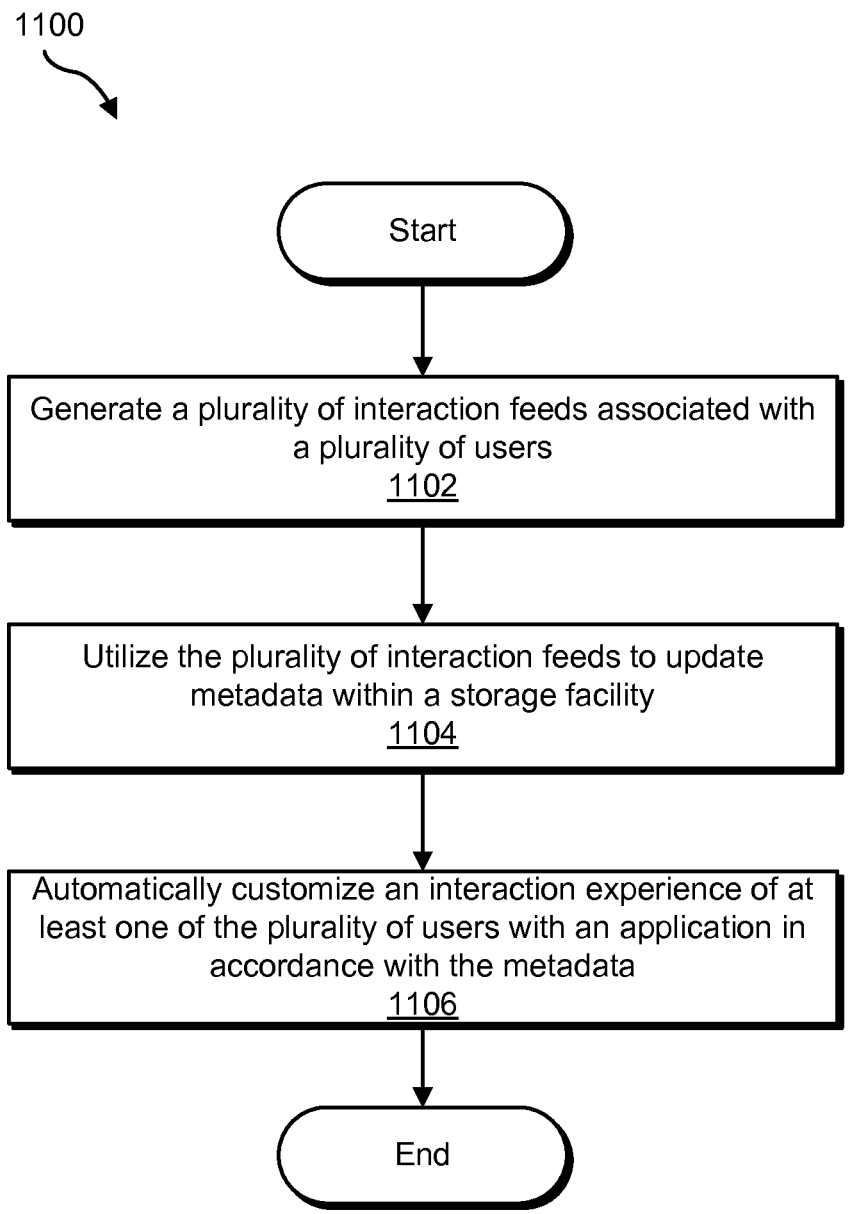
FIG. 11 illustrates another exemplary method of automatically customizing an interaction experience of one or more users with one or more applications according to principles described herein.

FIG. 11 illustrates another exemplary method 1100 of automatically customizing an interaction experience of one or more users with one or more applications. While FIG. 11 illustrates exemplary steps according to one embodiment, other embodiments may omit, add to, reorder, and/or modify any of the steps shown in FIG. 11.

In step 1102, a plurality of interaction feeds associated with a plurality of users are generated. The interaction feeds may each comprise data representative of at least one application interaction event performed by an access device associated with a distinct user within the plurality of users. The interaction feeds may be generated in any of the ways described herein.

In step 1104, the plurality of interaction feeds are utilized to update metadata within a storage facility. The metadata may be updated with the interaction feeds in any of the ways described herein.

In step 1106, an interaction experience of at least one of the plurality of users with an application is automatically customized in accordance with the metadata. The interaction experience may be automatically customized in any of the ways described herein.

As detailed above, the methods and systems described herein facilitate automatic customization of an interaction experience of one or more users with one or more media content applications. As an example, an exemplary method includes generating an interaction feed corresponding to a user of at least one access device, the interaction feed comprising data representative of an interaction of the at least one access device with one or more media content applications, updating metadata within a storage facility with the interaction feed, and automatically customizing an interaction experience of at least one of the user and another user with a media content application in accordance with the metadata.

Another exemplary method includes generating a plurality of interaction feeds associated with a plurality of users, the interaction feeds each comprising data representative of at least one media content application interaction event performed by an access device associated with a distinct user within the plurality of users, utilizing the plurality of interaction feeds to update metadata within a storage facility, and automatically customizing an interaction experience of at least one of the plurality of users with a media content application in accordance with the metadata.

An exemplary system includes an interaction feed generation facility configured to generate an interaction feed corresponding to a user of at least one access device, the interaction feed comprising data representative of an interaction of the at least one access device with one or more media content applications, a metadata layer facility selectively and communicatively coupled to the interaction feed generation facility and configured to update metadata with the interaction feed, and a customization facility selectively and communicatively coupled to the metadata layer facility and configured to automatically customize an interaction experience of at least one of the user and another user with a media content application in accordance with the metadata.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    generating an interaction feed corresponding to a user of at least one access device, the interaction feed comprising data representative of an interaction of the user on the at least one access device with a first media content application via a first graphical user interface;
    updating metadata within a storage facility with the interaction feed;
    automatically customizing, in accordance with the metadata, an interaction experience of another user via a second graphical user interface of a second media content application not included in and not including the first media content application; and
    presenting a notification message within the second graphical user interface indicating that the customizing of the interaction experience of the another user resulted from the interaction of the user with the first media content application via the first graphical user interface.

2. The method of claim 1, further comprising:
    generating another interaction feed corresponding to the another user;
    updating the metadata within the storage facility with the another interaction feed; and
    further customizing the interaction experience of at least one of the user and the another user within the second graphical user interface of the second media content application in accordance with the metadata updated with the another interaction feed.

3. The method of claim 1, wherein the interaction feed is generated using a custom markup language.

4. The method of claim 1, wherein the automatic customizing of the interaction experience comprises presenting a media content recommendation based on the metadata.

5. The method of claim 1, wherein the automatic customizing of the interaction experience comprises customizing at least one option associated with the second media content application based on the metadata.

6. The method of claim 1, wherein the automatic customizing of the interaction experience comprises presenting a customized advertisement based on the metadata.

7. The method of claim 1, wherein the automatic customizing of the interaction experience comprises customizing the interaction experience in accordance with a user profile associated with at least one of the user and the another user.

8. The method of claim 1, wherein the interaction feed further comprises data representative of an interaction of the user on the at least one access device with a third media content application via a third graphical user interface, the third media content application residing within a distinct application server from the first media content application and being associated with a distinct network platform from the first media content application.

9. The method of claim 1, wherein the first media content application resides on the at least one access device, and wherein the automatic customizing is performed by the at least one access device.

10. The method of claim 1, wherein the automatic customizing comprises:
    accessing, with a computing device associated with the second media content application, the metadata within the storage facility; and
    directing, with the computing device, the second media content application to customize the interaction experience based on the metadata.

11. The method of claim 1, tangibly embodied as computer-executable instructions on at least one non-transitory computer-readable medium.

12. A method comprising:
    generating a plurality of interaction feeds associated with a plurality of users, the interaction feeds each comprising data representative of at least one media content application interaction event performed via a first graphical user interface and by an access device associated with a distinct user within the plurality of users;
    utilizing the plurality of interaction feeds to update metadata within a storage facility;
    automatically customizing, in accordance with the metadata, an interaction experience of another user via a second graphical user interface of a media content application; and
    presenting a notification message within the second graphical user interface indicating that the customizing of the interaction experience of the another user resulted from the media content application interaction event performed via the first graphical user interface.

13. The method of claim 12, wherein the automatic customizing of the interaction experience comprises presenting a media content recommendation based on the metadata to the at least one of the plurality of users.

14. The method of claim 12, wherein the automatic customizing of the interaction experience comprises customizing at least one option associated with the media content application based on the metadata.

15. The method of claim 12, wherein the media content application resides on the at least one access device, and wherein the automatic customizing is performed by the at least one access device.

16. The method of claim 12, wherein the automatic customizing comprises:
    accessing, with a computing device associated with the media content application, the metadata within the storage facility; and
    directing, with the computing device, the media content application to customize the interaction experience based on the metadata.

17. A system comprising:
    at least one computing device that comprises:
    an interaction feed generation facility configured to generate an interaction feed corresponding to a user of at least one access device, the interaction feed comprising data representative of an interaction of the user on the at least one access device with a first media content application via a first graphical user interface;

a metadata layer facility selectively and communicatively coupled to the interaction feed generation facility and configured to update metadata with the interaction feed; and a customization facility selectively and communicatively coupled to the metadata layer facility and configured to automatically customize, in accordance with the metadata, an interaction experience of another user via a second graphical user interface of a second media content application not included in and not including the first media content application, and present a notification message within the second graphical user interface indicating that the customizing of the interaction experience of the another user resulted from the interaction of the user with the first media content application via the first graphical user interface.

18. The system of claim 17, further comprising a storage facility communicatively coupled to the metadata layer facility and configured to maintain the metadata.

19. The system of claim 17, wherein the interaction feed generation facility is configured to generate the interaction feed by detecting one or more interaction events associated with the user and generating interaction feed data representative of the one or more interaction events for inclusion within the interaction feed.

20. The system of claim 17, wherein the customization facility is configured to automatically customize the interaction experience by presenting a media content recommendation based on the metadata.

21. The system of claim 17, wherein the customization facility is configured to automatically customize the interaction experience by customizing at least one option associated with the second media content application based on the metadata.

22. The system of claim 17, wherein the customization facility is configured to automatically customize the interaction experience by presenting a customized advertisement based on the metadata.

23. The system of claim 17, wherein the customization facility is configured to automatically customize the interaction experience by customizing the interaction experience in accordance with a user profile associated with at least one of the user and another user.

* * * * *